United States Patent
Osafune et al.

(10) Patent No.: US 7,019,936 B2
(45) Date of Patent: Mar. 28, 2006

(54) METHOD AND APPARATUS FOR HEAD POSITIONING CONTROL IN PERPENDICULAR MAGNETIC RECORDING OF DISK DRIVE

(75) Inventors: Koji Osafune, Ome (JP); Kazuhito Shimomura, Fussa (JP); Koji Yano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/901,296

(22) Filed: Jul. 29, 2004

(65) Prior Publication Data

US 2005/0024762 A1     Feb. 3, 2005

(30) Foreign Application Priority Data

Jul. 31, 2003   (JP)   ............... 2003-204402

(51) Int. Cl.
    *G11B 5/596*   (2006.01)
(52) U.S. Cl. .................. 360/77.08; 360/77.02; 360/78.04
(58) Field of Classification Search ................ None
    See application file for complete search history.

(56) References Cited

U.S. PATENT DOCUMENTS

| | | | |
|---|---|---|---|
| 5,268,884 A | * | 12/1993 | Kiuchi et al. ............ 360/78.04 |
| 5,978,168 A | | 11/1999 | Mathews et al. ......... 360/77.04 |
| 6,067,205 A | | 5/2000 | Mathews et al. ......... 360/77.04 |
| 6,160,674 A | | 12/2000 | Yun et al. ................. 360/60 |
| 6,522,497 B1 | | 2/2003 | Kitagawa ................. 360/78.04 |

FOREIGN PATENT DOCUMENTS

| | | |
|---|---|---|
| JP | 7-29321 A | 1/1995 |
| JP | 11-66509 | 3/1999 |
| JP | 2002-93083 A | 3/2002 |

OTHER PUBLICATIONS

Hiroaki Muraoka et al., "200 kFRPI Data Recording Using a Novel Bi-Layered Head in Perpendicular Magnetic Recording," IEEE Transactions on Magnetics, vol. 29, No. 6, Nov. 1993, pp. 4074-4076.
Austrian Search Report dated Apr. 8, 2005 for Singapore Appln. No. 200404391-5.

* cited by examiner

*Primary Examiner*—Andrew L. Sniezek
(74) *Attorney, Agent, or Firm*—Pillsbury Winthrop Shaw Pittman, LLP

(57) ABSTRACT

A perpendicular magnetic recording disk drive is discloses which performs a head positioning control operation effectively against a hard easy transition shift (HETS) phenomenon. In the disk drive, a CPU performs an offset correcting operation in positioning control mode after a seek operation, using an offset value set on the basis of the HETS phenomenon from a memory when data is recorded.

9 Claims, 8 Drawing Sheets

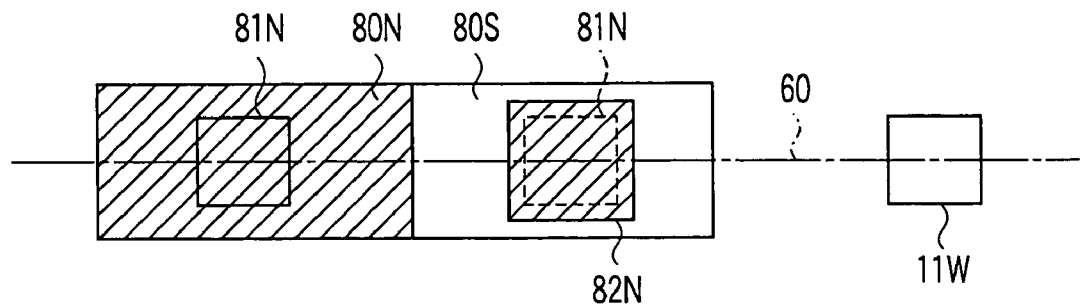
FIG. 8
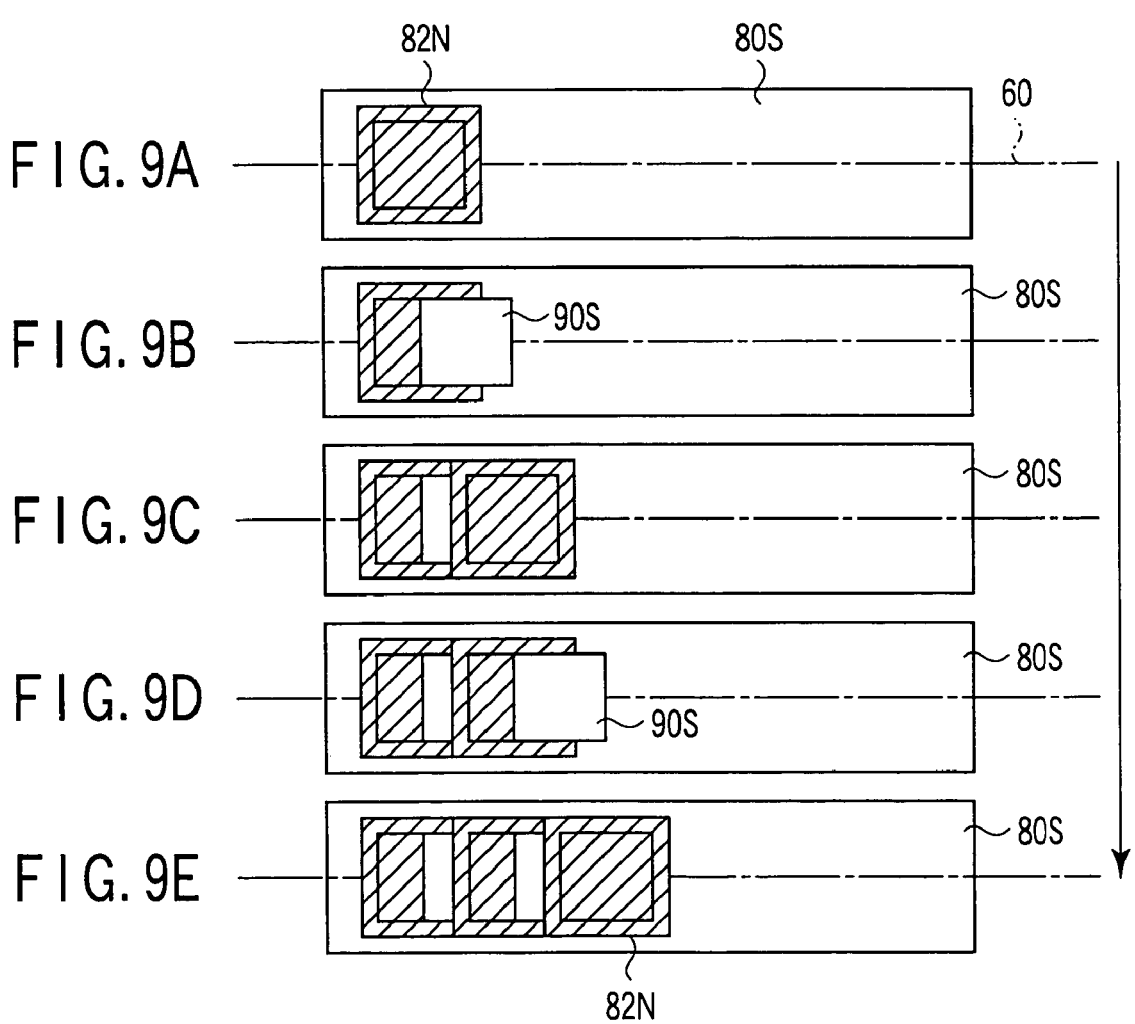

METHOD AND APPARATUS FOR HEAD POSITIONING CONTROL IN PERPENDICULAR MAGNETIC RECORDING OF DISK DRIVE

CROSS-REFERENCE TO RELATED APPLICATIONS

This application is based upon and claims the benefit of priority from prior Japanese Patent Application No. 2003-204402, filed Jul. 31, 2003, the entire contents of which are incorporated herein by reference.

BACKGROUND OF THE INVENTION

1. Field of the Invention

The present invention relates generally to a perpendicular magnetic recording disk drive, and more particularly to a head positioning control operation that is performed based on servo data that is perpendicularly magnetically recorded.

2. Description of the Related Art

Practical use of disk drives of perpendicular magnetic recording has recently been promoted. In the perpendicular magnetic recording, generally, servo data used for head positioning control is recorded on a disk medium (referred to as a disk hereinafter) by a write head that is called a single pole type (SPT) head suitable for perpendicular magnetic recording.

As is known, the servo data is broadly divided into a cylinder code (track address) for identifying a track (cylinder) on the disk and a servo burst signal (sometimes called burst data) for sensing a position of the head within each track.

A disk drive incorporates a head positioning control system using a CPU as a main component. This system puts a read/write head in a target position (target track position) on a disk based on servo data that is reproduced by a read head (which is normally made of a GMR element) of the read/write head.

If no servo data can be reproduced correctly, it is naturally difficult to position a head correctly. As a measure to avoid an error in reading a servo mark included in servo data, a method of optimizing a sense current of a GMR element that configures a read head is proposed (refer to Jpn. Pat. Appln. KOKAI Publication No. 11-66509, for example).

Since the read/write head is configured to perform its read/write operation, there exists an offset between head elements. A method of offsetting in head positioning mode using a pre-measured offset value as well as servo data is proposed (refer to U.S. Pat. No. 5,978,168 (1999) and U.S. Pat. No. 6,067,205 (2000), for example).

In a perpendicular magnetic recording disk drive, the following phenomenon is confirmed: If a single-pole write head applies a magnetic field of recorded data whose polarity is opposite to the magnetization polarity of data magnetically recorded in advance on a disk, the recorded data changes in magnetization state. This phenomenon is called a hard easy transition shift (sometimes referred to as HETS hereinafter) or simply called a hard transition (see, for example, "200 kFRPI Data Recording Using a Novel Bi-Layered Head in Perpendicular Magnetic Recording," IEEE Transaction on Magnetics, Vol. 29, No. 6, November 1993, Page 4074). In the HETS, when a head writes data whose magnetization polarity is opposite to that of a disk on which data has not yet been recorded, an apparent magnetic field viewed from the head becomes strong and a magnetization displacement point is shifted.

In the above perpendicular magnetic recording disk drive, the HETS phenomenon is confirmed in which a magnetization state of data changes when the data is magnetically recorded on the disk by the write head.

In the perpendicular magnetic recording disk drive, a head positioning control system compares a cylinder code reproduced from servo data read by the read head and a target cylinder code with each other in head positioning mode. In this comparison, the occurrence of errors in comparison due to the HETS phenomenon is confirmed by a performance evaluation test on the disk drive. A number of errors in comparison occur particularly in cylinder codes of tracks at the inner radius of the disk where the recording density of servo data increases.

In general, a track that causes an error in comparison between cylinder codes is registered as a defective track at the time of manufacture and not used for recording of data and, in other words, a so-called alternate track assigning operation is performed. However, a disk drive with defective tracks exceeding a prescribed number is treated as a defective one.

Consequently, the manufacturing yields of disk drives deteriorate if a number of errors in comparison between cylinder codes occur. Since, moreover, an alternate track assigning operation is required if an error in comparison between cylinder codes occurs after shipment of products, the performance of write operations decreases.

BRIEF SUMMARY OF THE INVENTION

An embodiment of the present invention is to provide a perpendicular magnetic recording disk drive including facilities to perform head positioning control that is effective against an HETS phenomenon.

According to an embodiment of the present invention, there is provided a disk drive comprising a head which records/reproduces data on/from a disk medium on which servo data is recorded by perpendicular magnetic recording, a memory which stores an offset value to correct an offset due to a hard easy transition shift (HETS) phenomenon when the servo data is perpendicularly magnetically recorded, and a controller which positions the head in a target position on the disk medium using the servo data and the offset value when the data is recorded.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a chart illustrating an HETS phenomenon in the disk drive according to the first embodiment of the present invention;

FIGS. 9A to 9E are charts each illustrating an operation of writing servo burst data in the disk drive according to the first embodiment of the present invention;

DETAILED DESCRIPTION OF THE INVENTION

Embodiments of the present invention will be described below with reference to the accompanying drawings.

Figure 1:
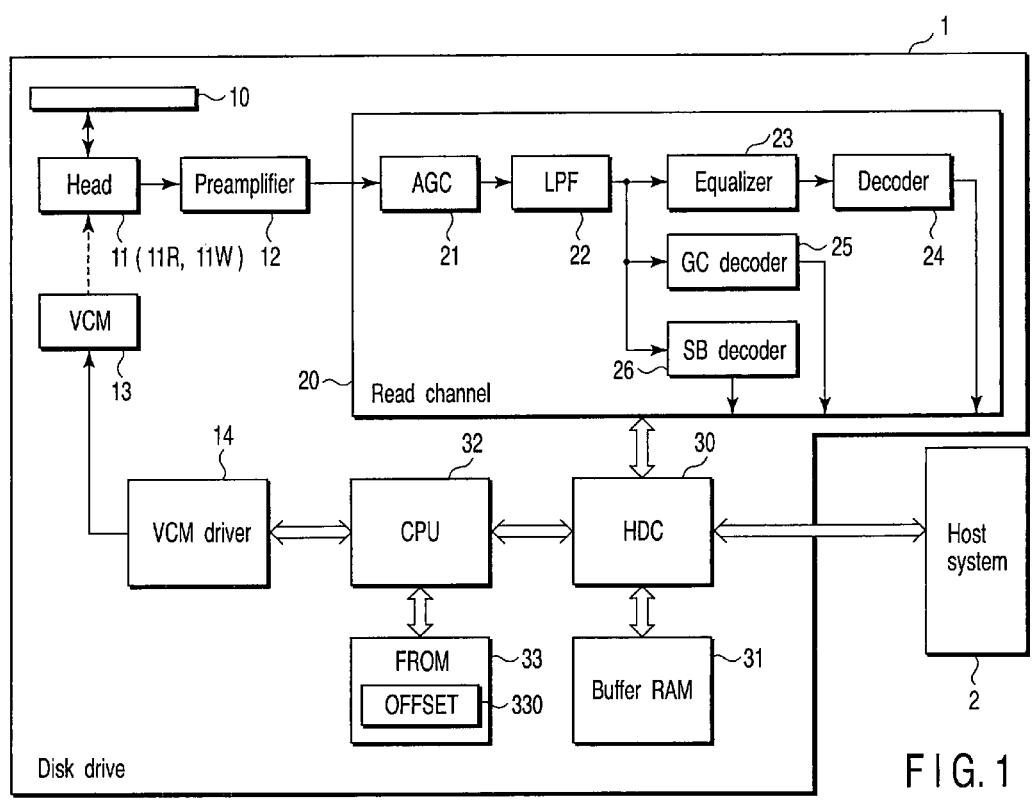
FIG. 1 is a block diagram of a disk drive according to a first embodiment of the present invention.
Figure 2:
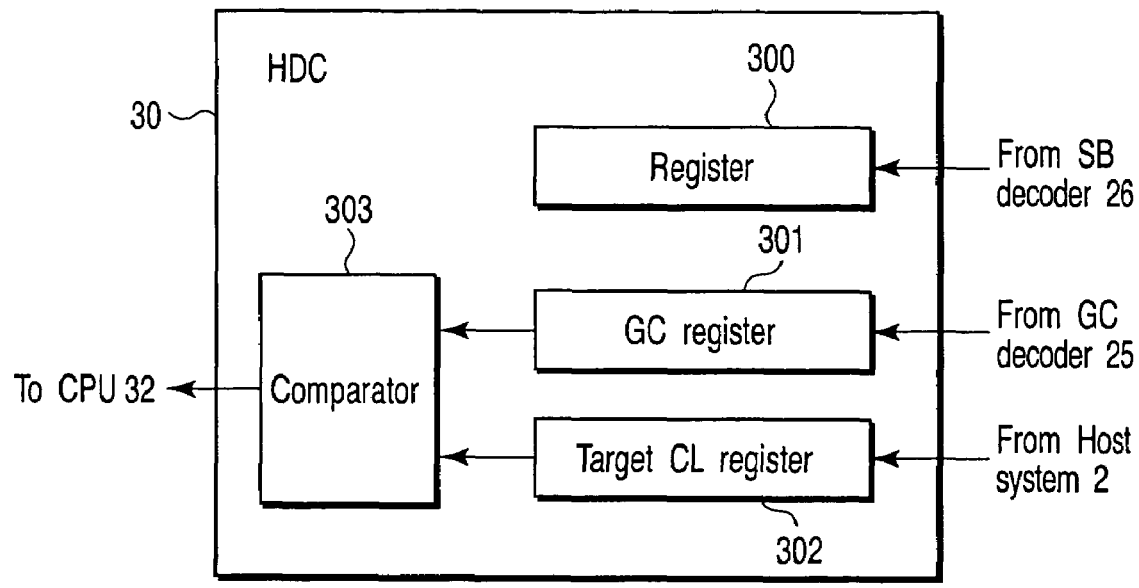
FIG. 2 is a block diagram of the main part of a disk controller of the disk drive according to the first embodiment of the present invention.
Figure 3:
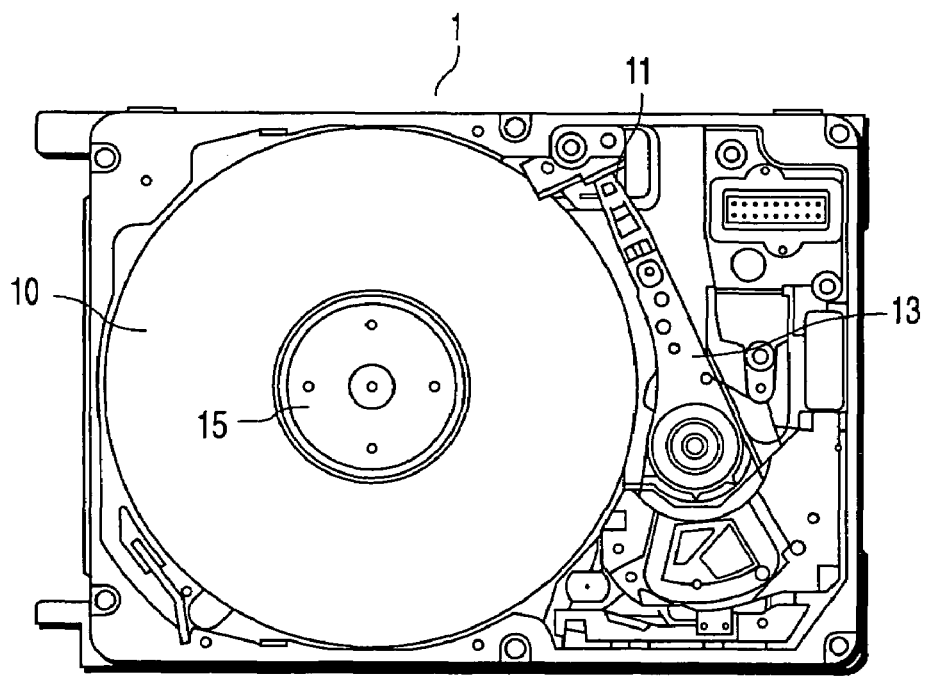
FIG. 3 is an external view of the disk drive according to the first embodiment of the present invention.

FIGS. 1 to 3 illustrate a configuration of a perpendicular magnetic recording disk drive according to an embodiment of the present invention.

(Configuration of Disk Drive)

FIG. 3 is an external view chiefly showing a mechanism of the disk drive.

As shown in FIG. 3, the disk drive 1 comprises a disk 10 of a perpendicular magnetic recording medium, a head 11 that reads/writes data from/to the disk 10, a spindle motor 15 that rotates the disk 10, and an actuator (carriage) 13 with the head 11.

The head 11 is a magnetic head including a write head 11W composed of a single pole head suitable for perpendicular magnetic recording and a read head 11R composed of a GMR (giant magnetoresistive) element. The write head 11W and read head 11R are mounted on the same slider separately from each other.

The actuator 13 includes a VCM (voice coil motor) and an arm and moves the head 11 in the radial direction of the disk 10 by the driving force of the VCM.

FIG. 1 is a block diagram chiefly showing control of the disk drive 1 and arrangement of an electronic circuit. FIG. 1 is also an illustration chiefly of a configuration of a head positioning control system. Components such as a write channel which are particularly associated with a data recording operation are omitted from FIG. 1.

Referring to FIG. 1, the disk drive 1 also comprises a preamplifier (read amplifier) 12, a read channel 20, a disk controller (HDC) 30, and a microprocessor (CPU) 32.

The preamplifier 12 amplifies a data signal (reproduction signal) read by the read head 11R of the head 11 and sends the amplified signal to the read channel 20. The read channel 20 is a PRML signal processing circuit and has an AGC (automatic gain control) amplifier 21 having an AGC function and an LPF (low-pass filter) 22.

The AGC amplifier 21 is an amplifier for adjusting the amplitude of the reproduction signal to a fixed value. The LPF 22 is an analog filter for reducing noise and equalizing an analog waveform.

The read channel 20 has a digital equalizer 23, a data decoder (referred to as a decoder hereinafter) 24, a gray code decoder (referred to as a GC decoder hereinafter) 25, and a servo burst signal decoder (referred to as an SB decoder hereinafter) 26.

The digital equalizer 23 includes an A/D converter to perform a digital equalization process for decoding an analog signal waveform output from the LPF 22 into a data signal. The decoder 24 includes a Viterbi decoder to decode (demodulate) the data signal into user data of digital data and send the user data to the HDC 30.

The analog signal waveform output from the LPF 22 is input to a servo decoder and decoded into servo data. The servo decoder is made up of the GC decoder 25 and the SB decoder 26.

The GC decoder 25 decodes a coded analog data signal recorded on the disk 10 into gray code data of a digital signal. The SB decoder 26 converts a peak value of an analog servo burst signal or an area integration signal corresponding to the peak value into burst data of digital values (A, B, C and D).

The HDC 30 receives the gray code data and burst data from the servo decoder as well as the user data decoded by the decoder 24, and performs part of a servo process necessary for head positioning as will be described later. In other words, the HDC 30 has a decoder that receives gray code data from the read channel 20 and decodes it into the original cylinder code.

The HDC 30 also converts serial data of the user data into parallel data and exchanges read/write data and commands with a host system 2. The HDC 30 stores data (read data) reproduced from the disk 10 and write data transferred from the host system 2 temporarily in a buffer RAM 31 to control data transfer between the HDC 30 and the host system 2.

The CPU 32 performs head positioning control, data read/write control and the like, which are associated with the embodiment of the present invention, in accordance with programs stored in a flash EEPROM (FROM) 33. The CPU 32 acquires information and signals necessary for head positioning control or commands from the host system 2 while communicating with the HDC 30.

(Disk Format)

Figure 4:
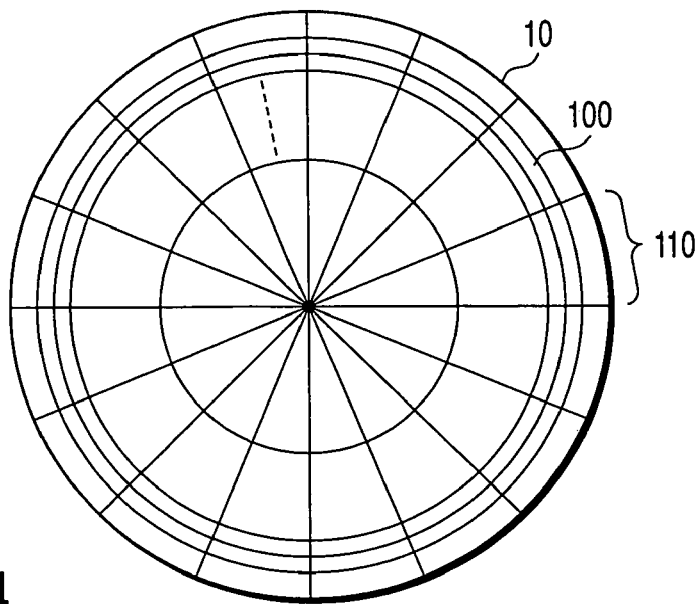
FIG. 4 is a chart of a disk format of the disk drive according to the first embodiment of the present invention.
Figure 5A:
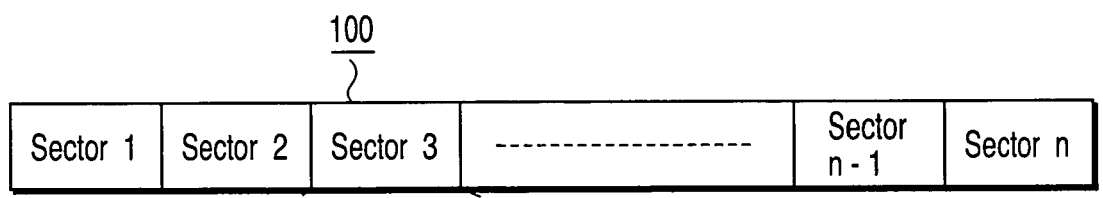
FIGS. 5A to 5C are charts showing the disk format in detail.
Figure 5B:
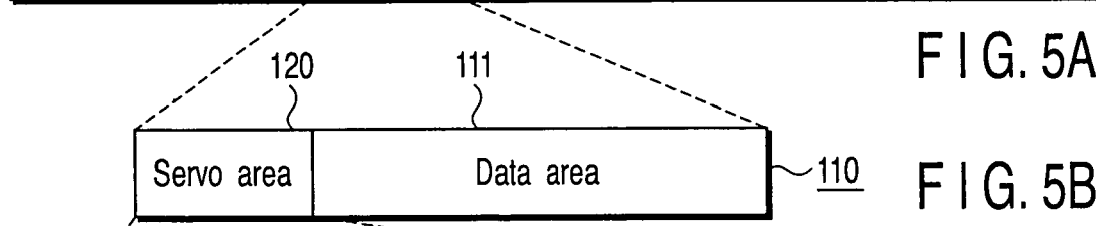

The disk 10 includes a number of tracks 100 as illustrated in FIG. 4. Each of the tracks 100 are divided at almost the same angle into a plurality of sectors 110 as shown in FIG. 5A. Each of the sectors 110 is roughly divided into a servo area 120 and a data area (data sector) 111 as shown in FIG. 5B. The data area 111 is a recording area on which user data is recorded.

Figure 5C:
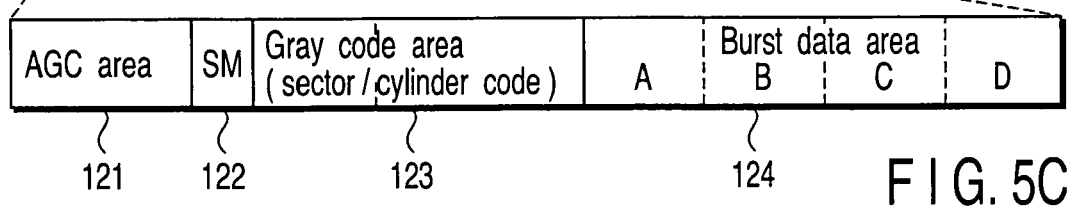

Servo data is recorded on the servo area 120 to position the head 11. AGC data 121, a servo mark (SM) 122, gray code data 123 and servo burst data (burst data A to D) 124 are recorded on the servo area 120 as shown in FIG. 5C.

Figure 6:
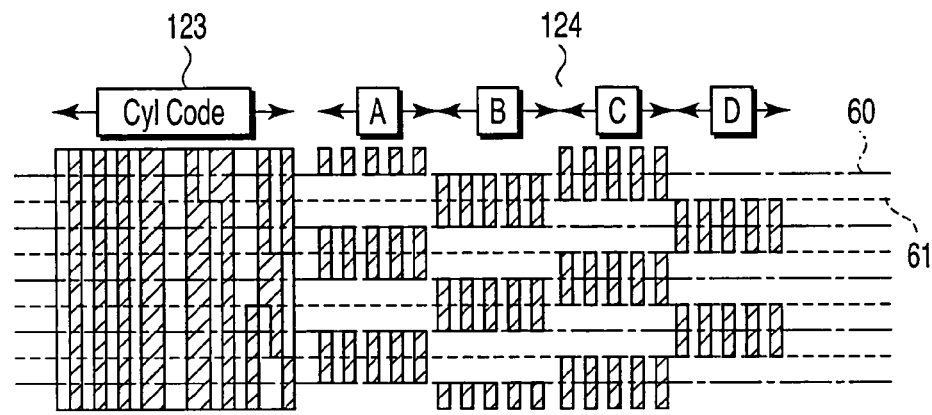
FIG. 6 is a chart illustrating servo data in the disk drive according to the first embodiment of the present invention.

The gray code data 123 includes a sector code indicative of a position of the head 11 in the rotating direction of the disk 10 and a cylinder code (track address) indicative of a position of the head 11 in the radial direction. The gray code data 123 and burst data 124 are arranged to have a relationship as shown in FIG. 6.

The CPU 32 controls a position of the head 11 such that the amplitude obtained when burst data A (simply referred to as burst A hereinafter) is reproduced and the amplitude obtained when burst data B (simply referred to as burst B hereinafter) is reproduced become the same to position the head 11 on the central line 60 of each track. Reference numeral 61 indicates a boundary between tracks.

The CPU 32 identifies a track for positioning the head 11 using a cylinder code (to be decoded by the HDC 30) included in the gray code data 123. In other words, the CPU 32 carries out a seek operation to move the head 11 to a target track based on the cylinder code acquired from the servo data.

(Head Positioning Control Operation)

A head positioning control operation according to the embodiment of the present invention will be described with reference to FIGS. 1, 2, 7 and 11.

Referring first to FIG. 1, when the host system 2 issues a write command, the CPU 32 positions the head 11 (write head 11W) in a target address on the disk 10 associated with the write command.

Upon receiving the write command from the host system 2, the HDC 30 holds target address information in a register included in the HDC 30. The CPU 32 can gain access to the register to acquire the command and target address information.

Usually, the target address information is sent from the host system 2 in CHS format where C means a cylinder code (target track address), H indicates a head number and S denotes a sector number. The HDC 30 has a register (target CL register) 302 for holding a target cylinder code supplied from the host system 2, as illustrated in FIG. 2. The HDC 30 also has a register (GC register) 301 for holding a cylinder code decoded by the GC decoder 25 included in the read channel 20. The cylinder code is a current track address in which the head 11 is positioned. The HDC 30 also has a register 300 for holding the burst data (A to D) output from the SB decoder 26.

Furthermore, the HDC 30 has a comparator 303 for comparing the target cylinder code set in the target CL register 302 and the current cylinder code set in the GC register 301. The CPU 32 determines a moving direction in which the head 11 moves to a target track (target cylinder) and a target speed at which the head 11 moves thereto to perform a seek operation.

The CPU 32 repeats the above process for each servo area 120 to compute a control operating value (digital value) based on the moving direction and target speed and send the value to a VCM driver 14. The VCM driver 14 supplies a VCM (actuator) 13 with a driving current corresponding to the control operating value. This seek operation allows the head 11 (write head 11W) to move to a target track.

When the head 11 reaches the target track, the CPU 32 controls the position of the head 11 using burst data (tracking control). In this position control, the CPU 32 reads an amplitude (digital value) of each of the bursts A and B from the register 300 of the HDC 30 and carries out a position error computation (steps S1, S2 and S3). The CPU 32 computes a position error of the head 11 with respect to the central line of the target track (an absolute value of a difference between bursts A and B) to control the position of the head such that the position error has a value of "0." This position control includes a process for stabilizing the control system.

The CPU 32 determines whether the cylinder code in which the write head 11W is currently located and the target cylinder code coincide with each other when the write head 11W positioned in the target track writes data sent from the host system 2. This comparison is carried out by the comparator 303 of the HDC 30, as described above.

When the comparison results coincide with each other, the HDC 30 supplies the CPU 32 with an output signal indicative of write enable from the comparator 303. The CPU 32 therefore writes data by the write head 11W of the head 11 positioned within the target track.

Figure 7:
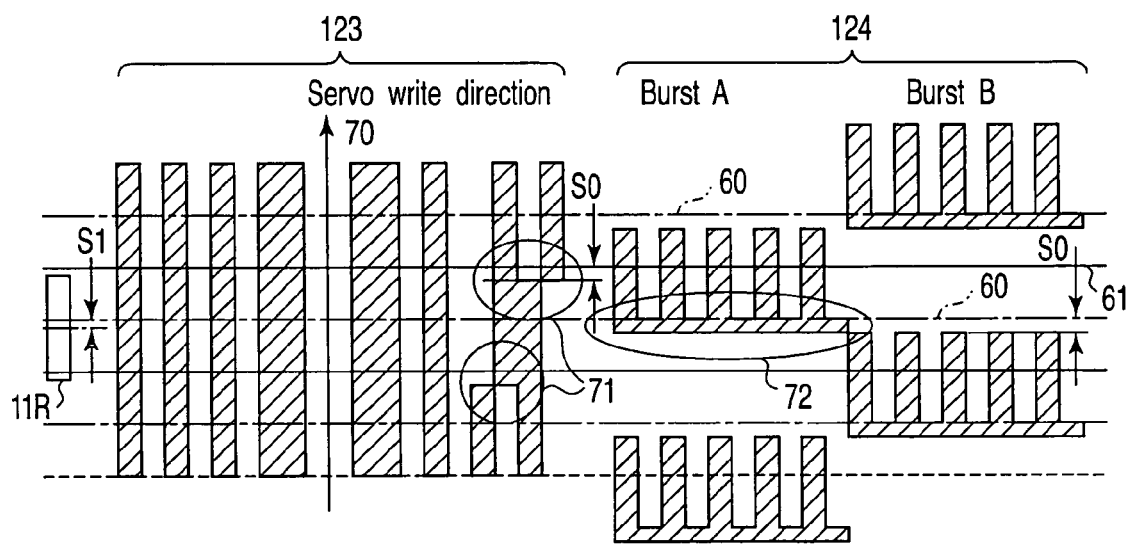
FIG. 7 is a chart illustrating servo data that is subjected to an HETS phenomenon in the disk drive according to the first embodiment of the present invention.

FIG. 6 shows an ideal recording state of servo data. FIG. 7 shows an example of a recording state of servo data recorded on the servo area 120 of the disk 10 by actual perpendicular magnetic recording.

As shown in FIG. 7, under the influence of the foregoing HETS phenomenon, the cylinder code 123 included in the servo data is shifted by amount S0 in a direction (width direction) opposite to a servo write direction 70 from the track boundary 61 and recorded in a portion 71 whose bits differ from those of an adjacent track.

The burst data 124 is recorded in such a manner that bits of the burst A or B are coupled by the width corresponding to the shift amount S0 in the vicinity of the central line 60 of a track (see the portion circled by numeral 72). In this recording state of servo data, if the read head 11R is positioned such that the amplitudes of the bursts A and B become the same (position error is 0), it is shifted by S1 (S0/2) from the central line 60.

The cylinder code 123 is shifted by amount S0 and recorded as described above. If, therefore, the read head 11R is positioned to eliminate a position error (burst A–burst B=0), it reads part (corresponding to an amount S1 of shift) of the cylinder code of the adjacent track that is servo-written afterward. However, the amount of data read from the adjacent track depends upon the width of the track from which data is reproduced by the read head 11R.

In general, cylinder addresses are assigned to the disk 10 to increase from the outer radius (e.g., 0 cylinder) to the inner radius. When the servo write direction is given from the inner radius of the disk to the outer radius thereof, the read head 11R reads part of the cylinder code of a track that is "−1" adjacent to the head-positioned track because the cylinder code is shifted and recorded toward the inner radius.

Conversely, when the servo write direction is given from the outer radius to the inner radius, the read head 11R reads part of the cylinder code of a track that is "+1" adjacent to the head-positioned track.

The GC decoder 25 of the read channel 20 is therefore easy to generate an error in decoding (reproducing) a cylinder code. Even though the head 11 is positioned in a track corresponding to the target cylinder code, the comparator 303 of the HDC 30 determines that the target cylinder code and the cylinder code (including part of the cylinder code of an adjacent track) read by the read head 11 do not coincide with each other. Thus, the HDC 30 generates a write fault to inhibit data from being written to the CPU 32 because a cylinder comparison error occurs.

The CPU 32 performs a position error computing operation and then an offset correcting operation to add an offset value 330 stored in the memory 33 to the result (position error) of the computing operation (step S4). The CPU 32 computes a control operating value based on the position error to which the offset value is added and sends it to the VCM driver 14 (steps S5 and S6).

The offset value 330, which is a correction value corresponding to the amount of shift S1, is used to adjust the head 11 to be shifted in a direction opposite to the servo write direction 70, as shown in FIG. 7. With the offset correcting operation, the head 11 (read head 11R) shifts by the amount S0 of shift from the original central line 60, and the amount of shift becomes equal to that (S0) of the cylinder code.

Consequently, the read head 11R correctly reads cylinder codes from the positioned track without reading any cylinder codes from the adjacent track.

Since an error in reproducing a cylinder code due to the HETS phenomenon can be prevented from occurring, the CPU 32 can write data to a target track by the write head 11W of the positioned head 11 based on the comparison result of the comparator 303 of the HDC 30, which indicates a coincidence between the cylinder code and the target cylinder code.

Figure 10:
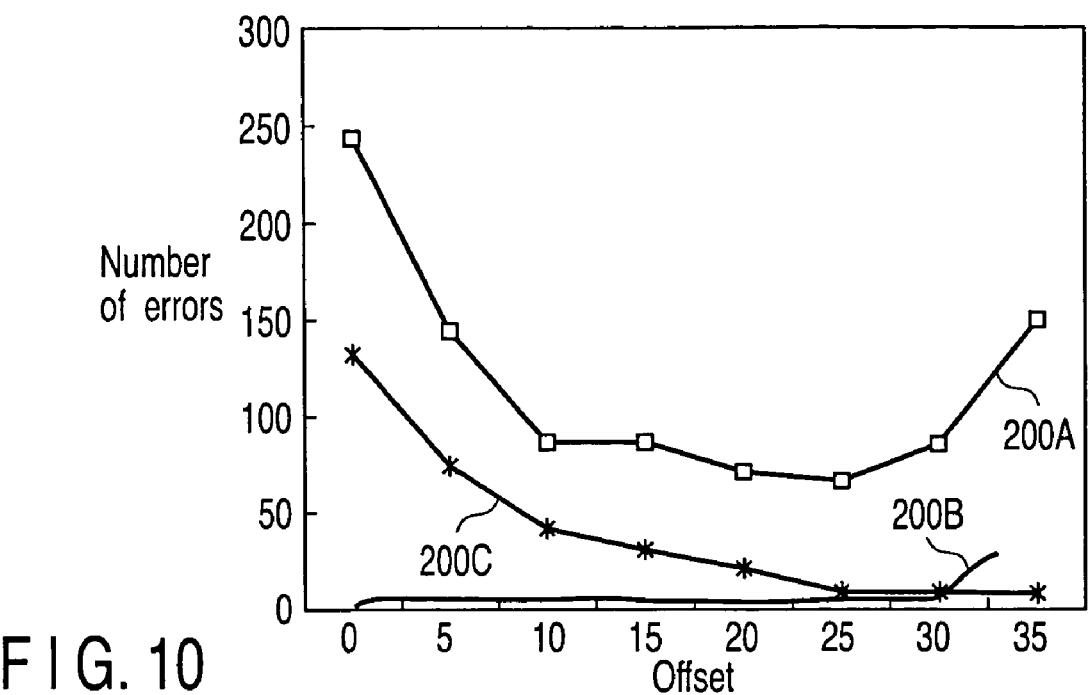
FIG. 10 is a graph illustrating a relationship an offset value and the number of errors in the disk drive according to the first embodiment of the present invention.
Figure 11:
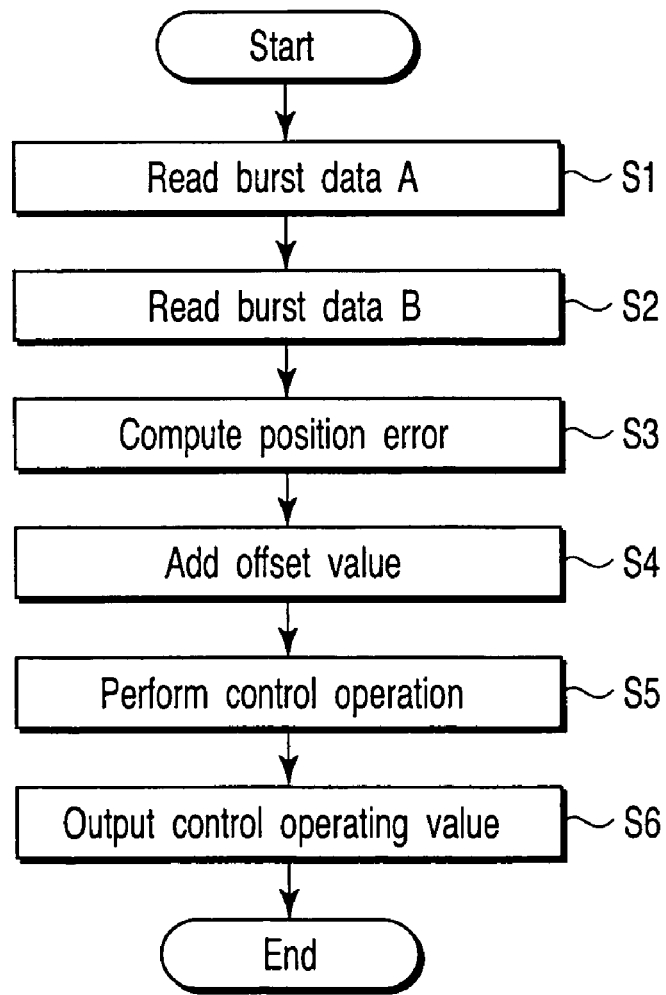
FIG. 11 is a flowchart illustrating a head positioning control operation of the disk drive according to the first embodiment of the present invention.

FIG. 10 shows a relationship between an offset value (X track pitch Tp/256) and a cylinder code comparing (reproducing) error. This relationship is obtained by measuring a range of about 4000 cylinders on the disk 10.

When the offset value is 0, the number of errors 200A in all compared sectors is approximately 250. Of these errors, the number of errors 200C in the −1 direction is about 140. As the offset value increases, the number of errors 200C in the −1 direction decreases. If the offset value increases too greatly, the number of errors 200B in the +1 direction increases and thus the number of errors 200A is likely to increase. In the example of FIG. 10, therefore, a value from 20 to 25 (about 10 percent of truck pitch Tp) can be considered to be the optimum offset value.

As described above, according to the present embodiment, an offset correcting operation to add an offset value to a position error in head positioning mode allows the number of cylinder code comparing (reproducing) errors to be reduced to about one third. Considering only cylinder code comparing errors in the −1 direction in particular, the number of errors can be reduced to about one tenth.

A sector in which a cylinder code comparing error occurs is registered as a defect sector incapable of recording data. A disk drive with defect sectors whose number exceeds a prescribed number is treated as a defect.

A disk drive that performs a head positioning control operation using an offset value can reduce the rate of occurrence of defects and thus improve the manufacturing yields of products. Moreover, a cylinder code comparing error can be prevented from occurring and so can be a write fault; thus, a write operation can be prevented from decreasing in performance.

(HETS Phenomenon and Measurement of Offset Value)

Figure 12:
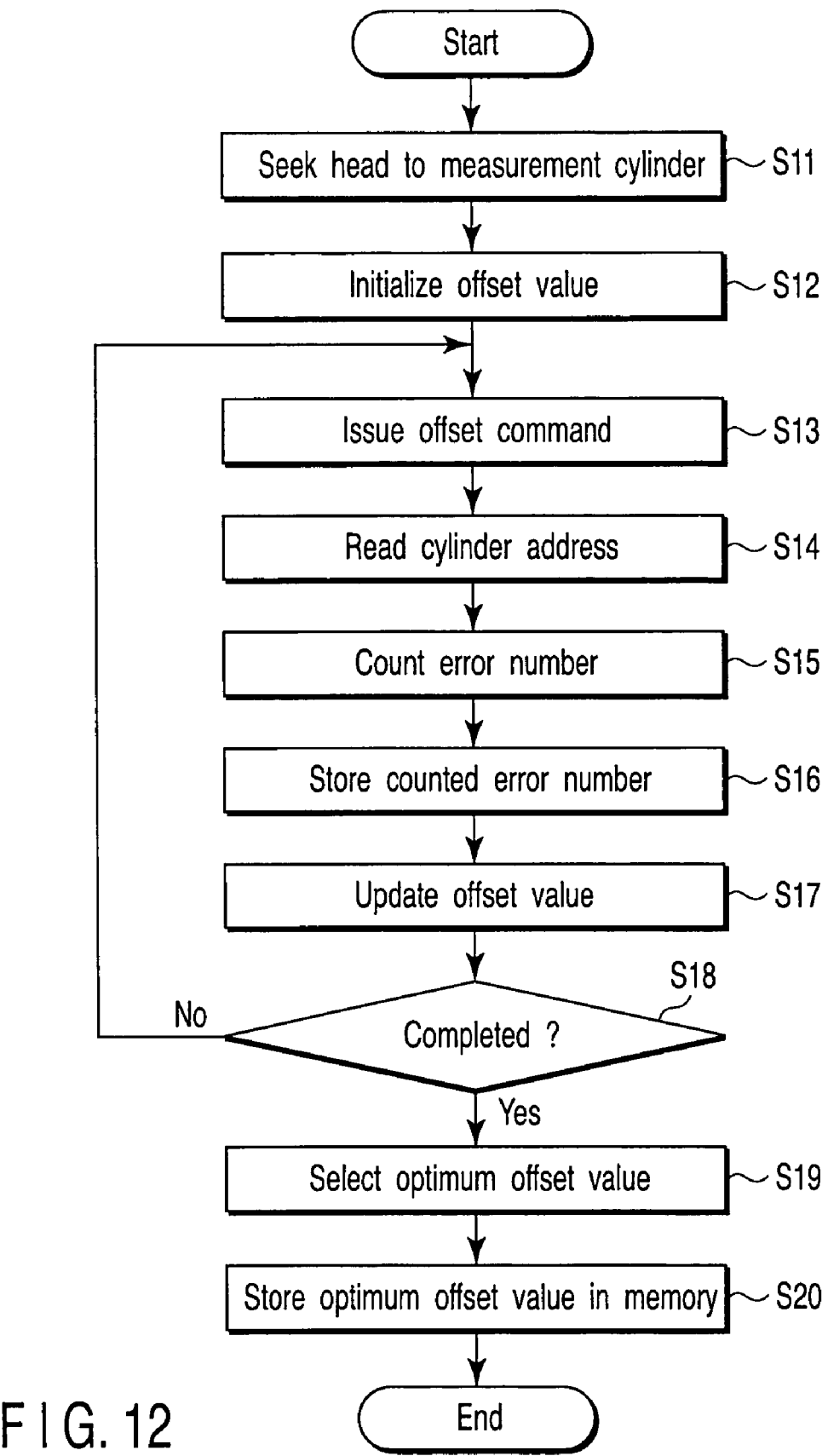
FIG. 12 is a flowchart illustrating a method of measuring an offset value in the disk drive according to the first embodiment of the present invention.

The HETS phenomenon according to the present embodiment and a method of measuring an offset value to be set to the memory 33 of the disk drive 1 will be described with reference to FIGS. 8, 9 and 12.

In perpendicular magnetic recording, when the single-pole write head 11W applies a magnetic field of recorded data whose polarity is opposite to the magnetization polarity (80S) of data magnetically recorded in advance on a disk, the recorded data changes in magnetization state, as shown in FIG. 8. This is the HETS phenomenon.

More specifically, when the write head 11W applies a magnetic field of recorded data whose polarity is the same as the magnetization polarity (80N) of a disk on which data has not yet been recorded, data whose magnetization (81N) corresponds to the shape of the head 11W is recorded.

When the write head 11W writes data whose magnetization polarity (81N) is opposite to that (80S) of a disk on which data has not yet been recorded, an apparent magnetic field viewed from the head becomes strong and a magnetization displacement point shifts, with the result that the magnetization (82N) of recorded data is larger than the head.

FIGS. 9A to 9E are charts showing an operation of writing servo burst data accompanied with the HETS phenomenon by the write head 11W in time series (the arrow indicates the order of writing). FIGS. 9B and 9D show recording states of overwritten data having the same magnetization polarity (90S).

A method of measuring an offset value will be described with reference to the flowchart of FIG. 12.

A step of measuring an offset value is included in the manufacturing process of the disk drive 1. The measurement is carried out using a dedicated inspection device (a main component of the computer corresponding to the host system 2). First, the inspection device causes the disk drive 1 to seek the head 11 to a measurement cylinder on the disk 10 (step S11). Then, the inspection device initializes an offset value and gives an offset command to the disk drive 1 (steps S12 and S13).

In the disk drive 1, the CPU 32 performs the above head positioning operation to move the head 11 by the offset value in response to the offset command. The inspection device gives a read command to read an address (cylinder code) of the measurement cylinder to the disk drive 1 (step S14). Then, the inspection device compares a preset target cylinder code of the measurement cylinder with a cylinder code read by the head 11 (read head 11R) of the drive 1 and reproduced by the read channel 20.

When the above cylinder codes do not coincide with each other, the inspection device considers the noncoincidence as an error. The inspection device counts the number of errors and stores the counted error number in the internal memory (steps S15 and S16). Instead of comparing the cylinder codes, the inspection device can count the number of write faults caused when data is recorded. In this case, the comparator 303 of hardware compares a target cylinder code and the current cylinder code. When they do not coincide with each other, the HDC 30 of the drive 1 issues write fault information. The inspection device obtains the write fault information from the drive 1 to measure a cylinder comparison error. After that, the inspection device updates a measurement offset value and repeats the above operation within the prescribed offset range (step S17 and NO in step S18).

Performing the above measurement operation, the inspection device selects an offset value that minimizes the number of cylinder comparison errors or an optimum offset value based on the counted error number stored in the internal memory (step S19). The inspection device stores the optimum offset value in the memory 33 of the drive 1 (step S20).

The inspection device obtains an optimum offset value in the radial direction of the disk medium 10 (for each track) or for each recording zone on the disk medium 10 and stores it in the memory 33. The recording zone means a recording range corresponding to each of inner, middle and outer radiuses of the disk medium having a number of tracks.

In the disk drive 1 after shipment, the CPU 32 carries out a head positioning control operation using the offset value 330 read out of the memory 33. It is thus possible to prevent an error in comparison of cylinder codes due to the HETS phenomenon or an error in reproduction of cylinder codes from occurring.

(Another Embodiment)

Figure 13:
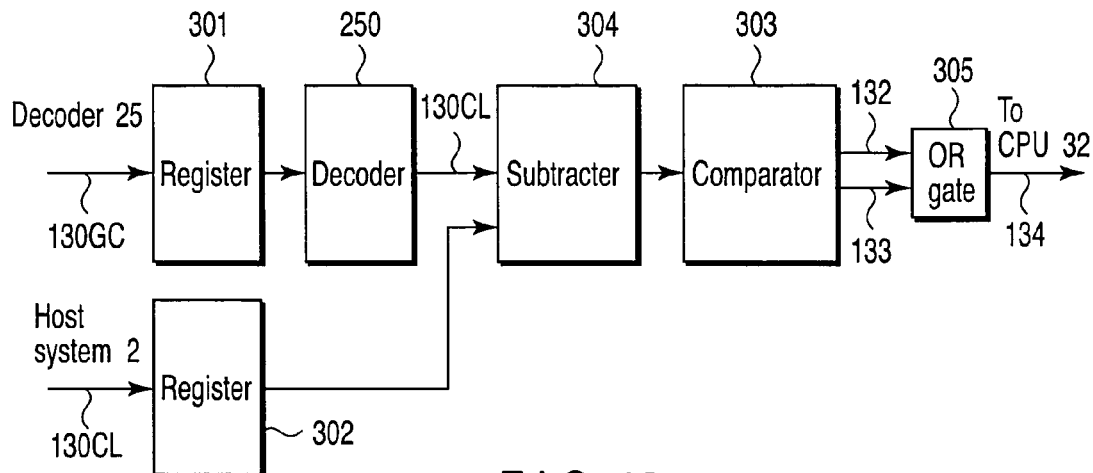
FIG. 13 is a block diagram of the main part of a disk controller in a disk drive according to a second embodiment of the present invention.

FIG. 13 is a block diagram of the main part of an HDC according to a second embodiment of the present invention.

The HDC comprises a decoder 250, a subtractor 304 and an OR gate 305 as well as the GC register 301, target CL register 302 and comparator 303.

A gray code 130GC is output from the GC decoder 25 of the read channel 20 and set in the GC register 301. The decoder 250 decodes the gray code 130GC to the original cylinder code 130CL. The cylinder code 130CL is input to one terminal of the subtractor 304. The cylinder code 130CL is the current cylinder code indicating an address of a track in which the head 11 is currently positioned.

On the other hand, a target cylinder code 131CL is set in the target CL register 302 by the host system 2. The subtractor 304 subtracts the target cylinder code 131CL and cylinder code 130CL from each other and outputs a subtraction result to the comparator 303.

The comparator 303 compares the subtraction result with a reference value (0 or 1)). When the comparison result is "0," a signal 132 is true (logic level is "1"). When the comparison result is "1," a signal 133 is true (logic level is "1"). If one of the signals 132 and 133 is true (logic level is "1"), the OR gate 305 supplies the CPU 32 with a signal 134 that is true (logic level is "1").

Upon receiving the signal 134, the CPU 32 determines that data is enabled to be written to a target track and performs a write operation using the write head 11W.

In short, when the result of subtraction between the target cylinder code (131CL) and the current cylinder code (130CL) is "0" or "1,", the HDC determines that the cylinder addresses coincide with each other and supplies a write enable signal 134 to the CPU 32 through the OR gate 305.

The configuration of the HDC according to the second embodiment allows a cylinder address comparison error due to the HETS phenomenon to be prevented from occurring in the following case.

A cylinder address error due to the HETS phenomenon occurs in association with a servo write direction in which servo data is recorded on the disk 10 (see FIG. 7). In other words, when servo data is written from the inner radius toward the outer radius of the disk 10, a read error occurs in the cylinder codes of the outer radius of the disk 10.

Usually, cylinder addresses are assigned to the disk 10 to increase from the outer radius (e.g., 0 cylinder) to the inner radius. When the servo write direction is given from the inner radius to the outer radius, a read error in cylinder address occurs in the "−1" direction. Conversely, when the servo write direction is given from the outer radius of the disk to the inner radius thereof, a read error in cylinder address occurs in the "+1" direction.

More specifically, when the target cylinder code is "3," a cylinder code read by the actually positioned head 11 may correspond to its external, adjacent cylinder code "2". When a result of subtraction between the target cylinder code "3" and the current cylinder code "2" is "1," the HDC determines that the cylinder addresses coincide with each other. In other words, the HDC determines that the head 11 is positioned in the target cylinder code "3" and enables the head 11 to write data.

(Modification)

Figure 14:
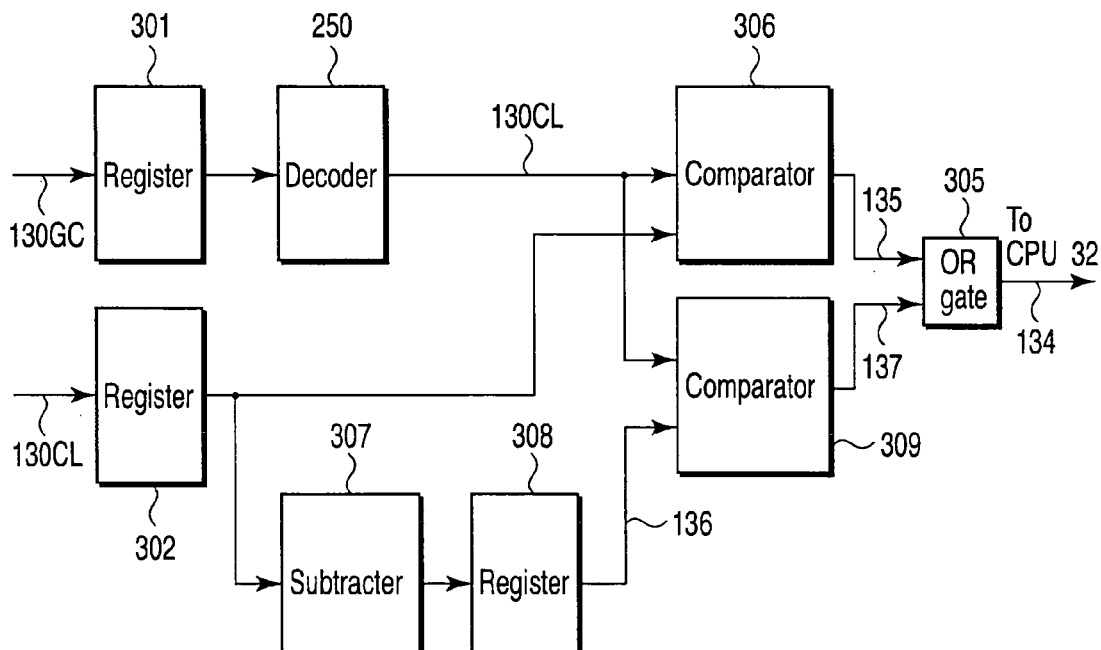
FIG. 14 is a block diagram showing a modification to the second embodiment of the present invention.

FIG. 14 is a block diagram showing a modification to the second embodiment of the present invention.

An HDC according to the modification includes a first comparator 306 and a second comparator 309. The first comparator 306 compares a current cylinder code 130CL decoded by the decoder 250 and a target cylinder code 131CL set in the target CL register 302. The second comparator 309 compares a current cylinder code 130CL and a cylinder code 136 obtained by subtracting "−1" from a target cylinder code 131CL by the subtractor 307. The cylinder code 136 is output from the subtractor 307 and held in the register 308 as a subtraction result.

When the cylinder codes compared by the first comparator 306 or the second comparator 309 coincide with each other, the OR gate 305 determines that the cylinder addresses coincide and outputs a signal 134 (write enable signal) that is true (logic level is "1") to the CPU 32.

The first comparator 306 outputs a signal 135 that is true (logic level is "1") when the current cylinder code 130CL and target cylinder code 131CL coincide with each other. The second comparator 309 outputs a signal 137 that is true (logic level is "1") when the current cylinder code 130CL and cylinder code 136 coincide with each other.

In the modification, too, when a comparison result between the target cylinder code 131CL and the current cylinder code 130CL is "0" or "1," the OR gate 305 determines that the cylinder addresses coincide with each other and outputs a write enable signal 134 to the CPU 32.

In the second embodiment and its modification, it is possible to determine that the current cylinder code is not a read error but whether it is one of "0" and "1" with reference to burst data (A to D).

In other words, when a result of position error computation using shifted burst data A and B is "0," the "−1" or "+1" cylinder code read out by the positioned head 11 is determined as a target cylinder code.

As described in detail above, the perpendicular magnetic recording disk drive according to each of the embodiments performs a head positioning control operation that is effective against the HETS phenomenon to prevent manufacturing yields of products from deteriorating and also prevent products in use from decreasing in performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
    a head which records/reproduces data on/from a disk medium on which servo data is recorded by perpendicular magnetic recording;
    a memory which stores an offset value to correct an offset due to a hard easy transition shift (HETS) phenomenon when the servo data is perpendicularly magnetically recorded; and
    a controller which positions the head in a target position on the disk medium using the servo data and the offset value when the data is recorded.

2. The disk drive according to claim 1, wherein the servo data includes a cylinder code to identify tracks formed on the disk medium and servo burst data to detect a position of the head within the tracks, and the controller performs a seek operation to move the head to the target position based on the cylinder code and uses the offset value when the head is positioned in the target position based on the servo burst data.

3. The disk drive according to claim 1, wherein the offset value is set in accordance with each of positions or recording zones in a radial direction of the disk medium.

4. The disk drive according to claim 1, wherein the offset value is set based on a result obtained by measuring an offset caused in a direction opposite to a servo write direction when the servo data is recorded on the disk medium.

5. The disk drive according to claim 1, wherein the servo data includes a cylinder code to identify tracks formed on the disk medium and servo burst data to detect a position of the head within the tracks, and the controller performs a seek operation to move the head to the target position based on the cylinder code and then a position error computation using the servo burst data to add the offset value to a result of the position error computation and position the head in the target position.

6. The disk drive according to claim 1, wherein the servo data includes a cylinder code to identify tracks formed on the disk medium and servo burst data to detect a position of the head within the tracks, and the disk drive further comprises a unit which compares the cylinder code read by the head and a target cylinder code corresponding to the target position after the controller positions the head in the target position.

7. A head positioning control method that is applied to a perpendicular magnetic recording disk drive having a disk medium on which servo data including cylinder codes and servo burst data is perpendicularly magnetically recorded, a head which records/reproduces data, and a memory which stores an offset value to correct an offset due to a hard transition shift (HETS) phenomenon when the servo data is perpendicularly magnetically recorded, the method comprising:

reading the servo burst data by the head moved to a target position;

performing a position error computation using the servo burst data; and positioning the head in the target position by adding the offset value to a result of the position error computation.

8. The method according to claim 7, further comprising comparing a cylinder code read by the head and a target cylinder code corresponding to the target position after the head is positioned in the target position.

9. The method according to claim 7, further comprising:

determining whether a cylinder code read by the head and a target cylinder code corresponding to the target position coincide with each other, including one of "+1" and "−1" cylinder codes determined based on a write direction of the servo data after the head is positioned in the target position; and writing data in the target position by the head when the target cylinder code and the cylinder code coincide with each other.

* * * * *